US010207426B2

(12) United States Patent
Braley et al.

(10) Patent No.: US 10,207,426 B2
(45) Date of Patent: Feb. 19, 2019

(54) CONTINUOUS FIBER FILAMENT FOR FUSED DEPOSITION MODELING (FDM) ADDITIVE MANUFACTURED (AM) STRUCTURES

(71) Applicant: NORTHROP GRUMMAN SYSTEMS CORPORATION, Falls Church, VA (US)

(72) Inventors: Daniel J. Braley, St. Peters, MO (US); Anthony M. Tamayo, Fontana, CA (US); Eric G. Barnes, Rancho Palos Verde, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 652 days.

(21) Appl. No.: 14/883,282

(22) Filed: Oct. 14, 2015

(65) Prior Publication Data

US 2017/0106565 A1    Apr. 20, 2017

(51) Int. Cl.
| B29B 13/00 | (2006.01) |
| B29B 13/02 | (2006.01) |
| B29C 70/08 | (2006.01) |
| B29D 99/00 | (2010.01) |
| B33Y 70/00 | (2015.01) |
| B29C 64/106 | (2017.01) |

(52) U.S. Cl.
CPC .......... B29B 13/022 (2013.01); B29C 70/083 (2013.01); B29D 99/0078 (2013.01); B29C 64/106 (2017.08); B33Y 70/00 (2014.12)

(58) Field of Classification Search
CPC ....... B29B 13/022; B29C 70/50; B29C 70/52; B29C 70/527; B29C 70/06; B29C 70/08; B29C 70/081; B29C 70/083; B29C 64/106; B29C 64/10; B29C 64/118; B29C 64/20; B29C 64/227; B29C 64/232; B29C 64/236; B29D 99/0078; B33Y 70/00; B33Y 30/00; B33Y 40/00

See application file for complete search history.

(56) References Cited

U.S. PATENT DOCUMENTS

| 4,212,097 A | 7/1980 | Portinari et al. |
| 4,279,470 A | 7/1981 | Portinari et al. |
| 4,332,436 A | 6/1982 | Adorni et al. |

(Continued)

FOREIGN PATENT DOCUMENTS

DE    20 2014 101 350 U1    4/2015

OTHER PUBLICATIONS

"CEDIA 2012: BES Demos Wire Python Magnetic Wire Pull" published by rAVe Publications on Sep. 8, 2012, accessed at https://www.youtube.com/watch?v=4iTyiTml1e8 on Nov. 16, 2018. (Year: 2012).*

Primary Examiner — Anthony Calandra
Assistant Examiner — Jamel M Nelson
(74) Attorney, Agent, or Firm — John A. Miller; Shumaker, Loop & Kendrick, LLP

(57) ABSTRACT

A system and method for producing a uniform continuous fiber filament. The system and method include a fiber tow with an axial magnet attached to an end of the fiber tow, a polymer tube, and a radial magnet that fits around a circumference of the polymer tube. The radial and axial magnets are used to feed the fiber tow through the polymer tube using magnetic forces to create the uniform continuous fiber filament.

19 Claims, 3 Drawing Sheets

(56) References Cited

U.S. PATENT DOCUMENTS

| | | | |
|---|---|---|---|
| 4,691,896 | A | 9/1987 | Reeve et al. |
| 4,796,970 | A | 1/1989 | Reeve et al. |
| 4,844,762 | A | 7/1989 | Schroder |
| 4,948,097 | A | 8/1990 | Reeve et al. |
| 5,169,126 | A | 12/1992 | Reeve et al. |
| 5,199,689 | A | 4/1993 | Proud et al. |
| 5,573,225 | A | 11/1996 | Boyle et al. |
| 5,936,861 | A | 8/1999 | Jang et al. |
| 6,251,340 | B1 | 6/2001 | Tseng |
| 6,730,252 | B1 | 5/2004 | Teoh et al. |
| 6,751,834 | B2 | 6/2004 | Gordon |
| 6,934,600 | B2 | 8/2005 | Jang et al. |

\* cited by examiner

CONTINUOUS FIBER FILAMENT FOR FUSED DEPOSITION MODELING (FDM) ADDITIVE MANUFACTURED (AM) STRUCTURES

BACKGROUND

Field

This invention relates generally to a system and method for creating a continuous fiber filament for fused deposition modeling (FDM) additive manufactured (AM) structures and, more particularly, to a system and method for feeding a continuous tow into a polymer tube and heating the polymer tube to melt and fuse the polymer tube to the continuous tow to create a wetted continuous fiber filament that is 3D printable.

Discussion

Fused filament fabrication (FFF), also known as fused deposition modeling (FDM), is an additive manufacturing (AM) technology and is a technique used for 3D printing. FDM works by laying down material layer by layer from a spool of material that is fed into a heated nozzle of a 3D printer to build a desired product. FDM utilizes software that processes an STL file (a stereolithography file format) and includes mathematically slicing and orienting the model for building the product layer by layer. Support structures may also be built layer by layer using a second spool of material, for example, a soluble material may be provided on the second spool to build a soluble support structure. The material from the spool or spools feeds into the heated nozzle, which causes the material to become molten. Upon ejecting, the molten material immediately begins to harden.

Various materials may be used for FDM, including acrylonitrile butadiene styrene (ABS), polylactic acid (PLA), polycarbonate (PC), polyamide (PA), polystyrene (PS), lignin, rubber, carbon fibers, thermoplastics, polyphenylsufone, ultra high molecular weight polyethylene (UHMWPE) Dyneema, Ultem 9085, high impact polystyrene (HIPS), nylon, high density polyethylene (HDPE) eutectic materials, plasticine, room temperature vulcanization (RTV) silicone, etc. Typically the material is selected to increase the structural properties of the 3D printed products that are made therefrom. The material used is sometimes referred to as continuous fiber filament or a fiber tow.

Known methods to create a continuous fiber filament that includes a fiber tow with a resin thereon includes running the fiber tow through a bath of the molten resin and allowing the resin to harden around the fiber. This requires an extrusion set-up, a structure that heats a resin bath, and a way to spool the fiber and resin mixture following heating. Typically these systems and processes are time-consuming and expensive. In addition, the process is difficult to control and there is a lack of uniformity in the resin that hardens around the fiber, i.e., the continuous fiber filament created lacks the desired uniformity. Thus, there is a need in the art for a reliable method to create uniform continuous fiber filaments that are suitable for FDM AM structures to eliminate the need for purchasing a known continuous fiber filaments that are expensive, time-consuming to create and that lack uniformity.

SUMMARY

A system and method for producing a uniform continuous fiber filament are disclosed. The system and method include a fiber tow with an axial magnet attached to an end of the fiber tow, a polymer tube, and a radial magnet that fits around a circumference of the polymer tube. The radial and axial magnets are used to feed the fiber tow through the polymer tube using magnetic forces to create the uniform continuous fiber filament.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for creating a continuous fiber filament are merely exemplary in nature, and is in no way intended to limit the invention or its applications or uses. For example, while the system and method may be used to create continuous fiber filaments for fused deposition modeling (FDM) additive manufacturing (AM), the system and method described herein may be used to create any type of continuous fiber filament.

Figure 1:
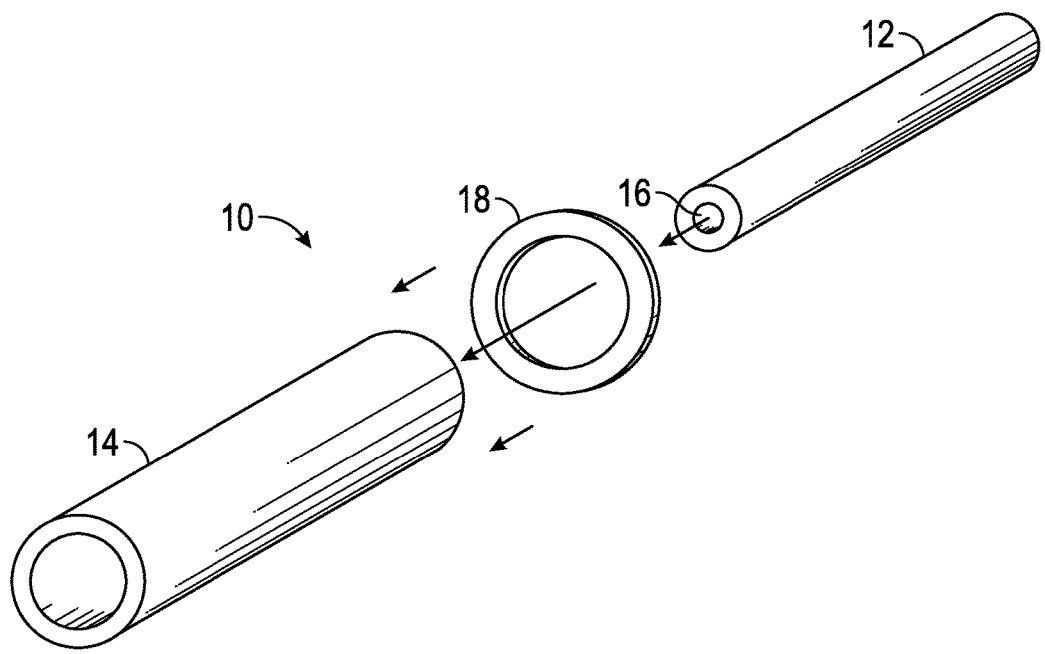
FIG. 1 is an isometric view of a continuous fiber tow being fed into a polymer tube using a radial and axial magnet to create a uniform continuous fiber filament.

FIG. 1 is an isometric view of an exemplary system 10 for creating a continuous fiber filament by feeding a continuous fiber tow 12 into a polymer tube 14. The fiber tow 12 and the polymer tube 14 may be selected from wide variety of materials and/or combinations of materials. For example, the fiber tow 12 may be one or more of E-glass, S-glass, carbon fiber, aramid fibers, ultra high molecular weight polyethylene (UHMWPE) fibers, Dyneema ST17, etc. The polymer tube 14 may be, for example, any suitable thermoplastic such as polyether ether ketone (PEEK), polyetherketone ketone (PEKK), Ultem, Nylon, polyethylene and UHMWPE. An outer diameter of the fiber tow 12 is smaller than an inner diameter of the polymer tube 14 to allow the fiber tow 12 to feed into the polymer tube 14. An axial magnet 16 is attached to an end of the fiber tow 12 and pulls the fiber tow 12 toward a radial magnet 18 using magnetic forces. In this embodiment, the radial magnet 18 fits around the circumference of the polymer tube 14 and is pulled over and around the polymer tube 14 to draw the axial magnet 16 and the fiber tow 12 through the polymer tube 14 to create a continuous fiber filament. However, the radial magnet 18 may be any suitable design that is capable of drawing the axial magnet 16 and the fiber tow 12 through the polymer tube 14.

Figure 2:
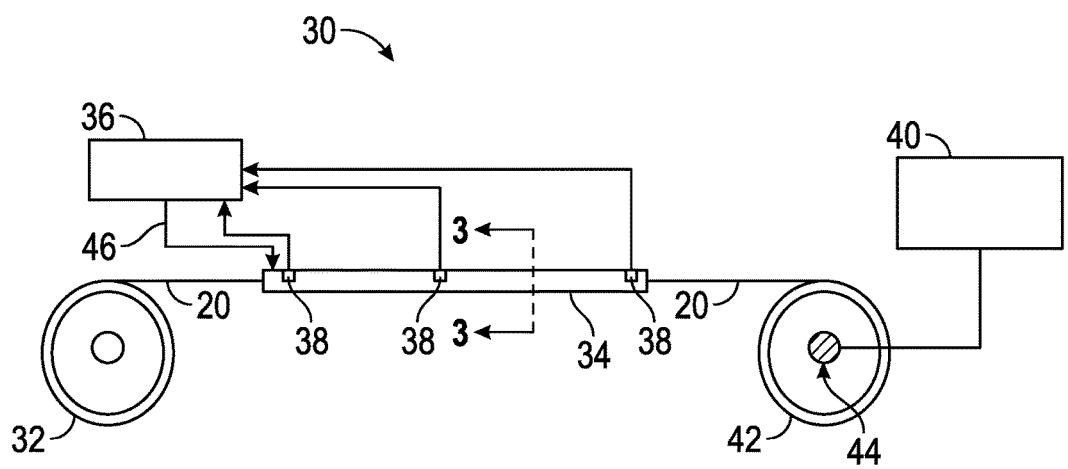
FIG. 2 is a schematic diagram of a system that may be used to wet the continuous fiber filament.

FIG. 2 is a schematic diagram of a system 30 that includes a spool 32 of a continuous fiber filament 20 that is made by feeding the fiber tow 12 into the polymer tube 14, as described in FIG. 1. The continuous fiber filament 20 on the spool 32 is pulled by a motor 44 to unwind the filament 20 from the spool 32 and to wind the filament 20 onto a spool 42. The motor 44 may be any suitable motor, for example, a stepper motor. A speed controller 40 is configured to regulate the motor 44 such that the filament 20 is pulled at a predetermined uniform tension and speed. The predetermined tension and speed depends on a variety of factors, including the material of the fiber tow 12, the material of the polymer tube 14, and a heating temperature, as described in more detail below.

Figure 3:
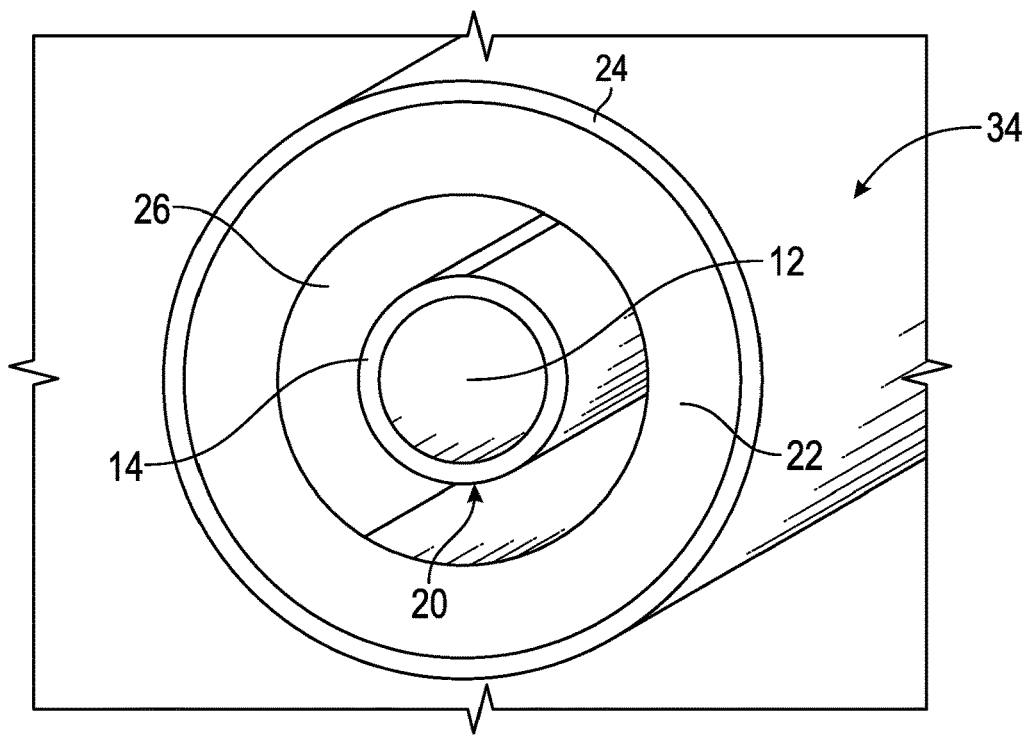
FIG. 3 is an cross-sectional view of the system that is used to wet the continuous fiber filament.

The system 30 includes a heating sub-system 34 through which the filament 20 travels from the spool 32 to the spool 42. The heating sub-system 34 melts the polymer tube 14 onto the fiber tow 12 as discussed herein. FIG. 3 is a cross-sectional view of the heating sub-system 34 through line 3-3 in FIG. 2. The heating sub-system 34 includes a copper tube 22 that is heated by a heater 24. The heater 24 may be any suitable heater, such as a blanket heater or a similar, blanket-type heater. For example, a BriskHeat® flexible rubber blanket heater that is 120 Volt, 400 Watt, and that is approximately 8 inches long and 3 inches wide may be used. Regulation of heat outputted by the heater 24 occurs by regulating input voltage and current to the heater, as is described in more detail below. A gap 26 between the inner circumference of the copper tube 22 and the outer circumference of the polymer tube 14 has a predetermined size that may depend on the heat required to melt the polymer tube 14.

Returning to FIG. 2, a temperature and current controller 36 provides input voltage and current to the heater 24 of the heating sub-system 34 on a line 46 that includes positive and negative wires. The temperature and current controller 36 controls the temperature of the heating sub-system 34 to achieve a predetermined temperature by using temperature signals from thermocouples 38 positioned at predetermined intervals along the sub-system 34 such that the amount of input voltage and current provided to the heater 24 on the line 46 is suitable to achieve the predetermined temperature. Once the polymer tube 14 of the continuous fiber filament 20 has been uniformly melted onto the fiber tow 12, the continuous fiber filament 20 is considered to be wetted. The continuous fiber filament 20 that has been uniformly wetted cools as it exits the heating sub-system 34 and is wound onto the spool 42 as described above.

Figure 4:
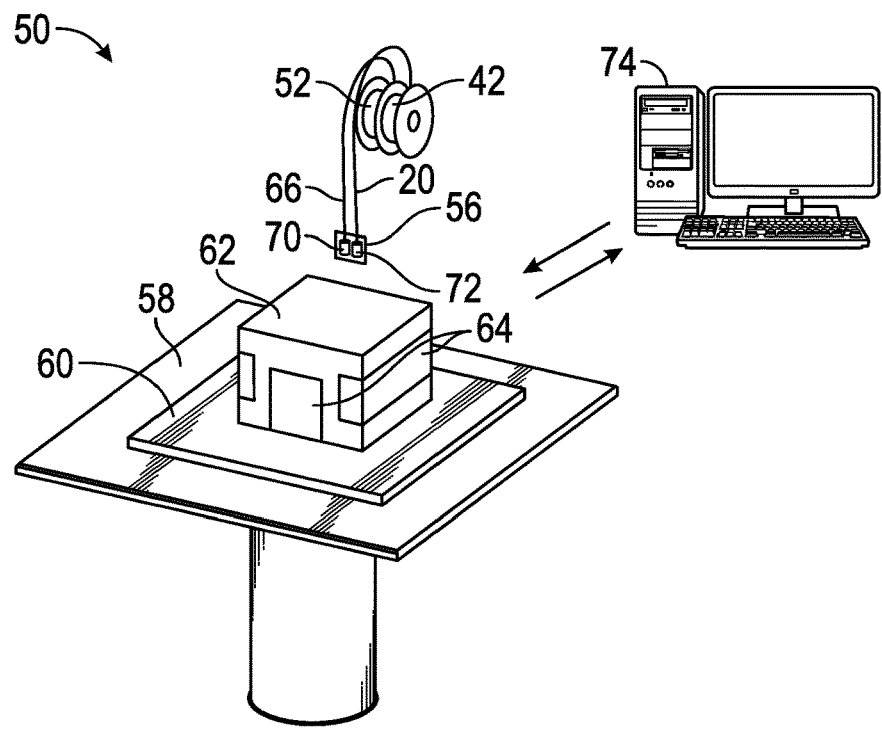
FIG. 4 is an isometric view of a fused deposition modeling 3D printer using the wetted continuous fiber filament.

FIG. 4 is an isometric view of an exemplary FDM 3D printer 50 that may be used to fabricate a product 62 made from the wetted continuous fiber filament 20. To fabricate the product 62, the continuous fiber filament 20 that has been wound on the spool 42 of FIG. 2 is fed into a first head 72 of a dual extrusion head and nozzle assembly 56, and a strand 66 of a support material from a spool 52 may be fed into a second head 70 of the assembly 56. While a dual extrusion head and nozzle assembly 56 is used herein, a single extrusion head or multiple extrusion head FDM 3D printer may be used. A build platform 58 having a base 60, such as a glass base, is positioned directly below the dual extrusion head and nozzle assembly 56. Using the building capabilities of the FDM 3D printer 50 and an associated computing device 74 that is programmed to control the FDM 3D printer 50 using certain parameters that are suitable for the continuous fiber filament 20 and the strand 66, the product 62 may be created from the continuous fiber filament 20 and a support structure 64 may be created from the strand 66.

The continuous fiber filament 20 may be fabricated into a strong product because the uniform continuous fiber filament 20 adheres to itself well when built up layer by layer using the FDM 3D printer 50. Thus, the continuous fiber filament 20 may be used to create a variety of products that require high strength characteristics and that may include complex geometries, such as aircraft wings, fuselage skins, internal aerospace components, radomes, antenna structures, clips, brackets, etc.

Figure 5:
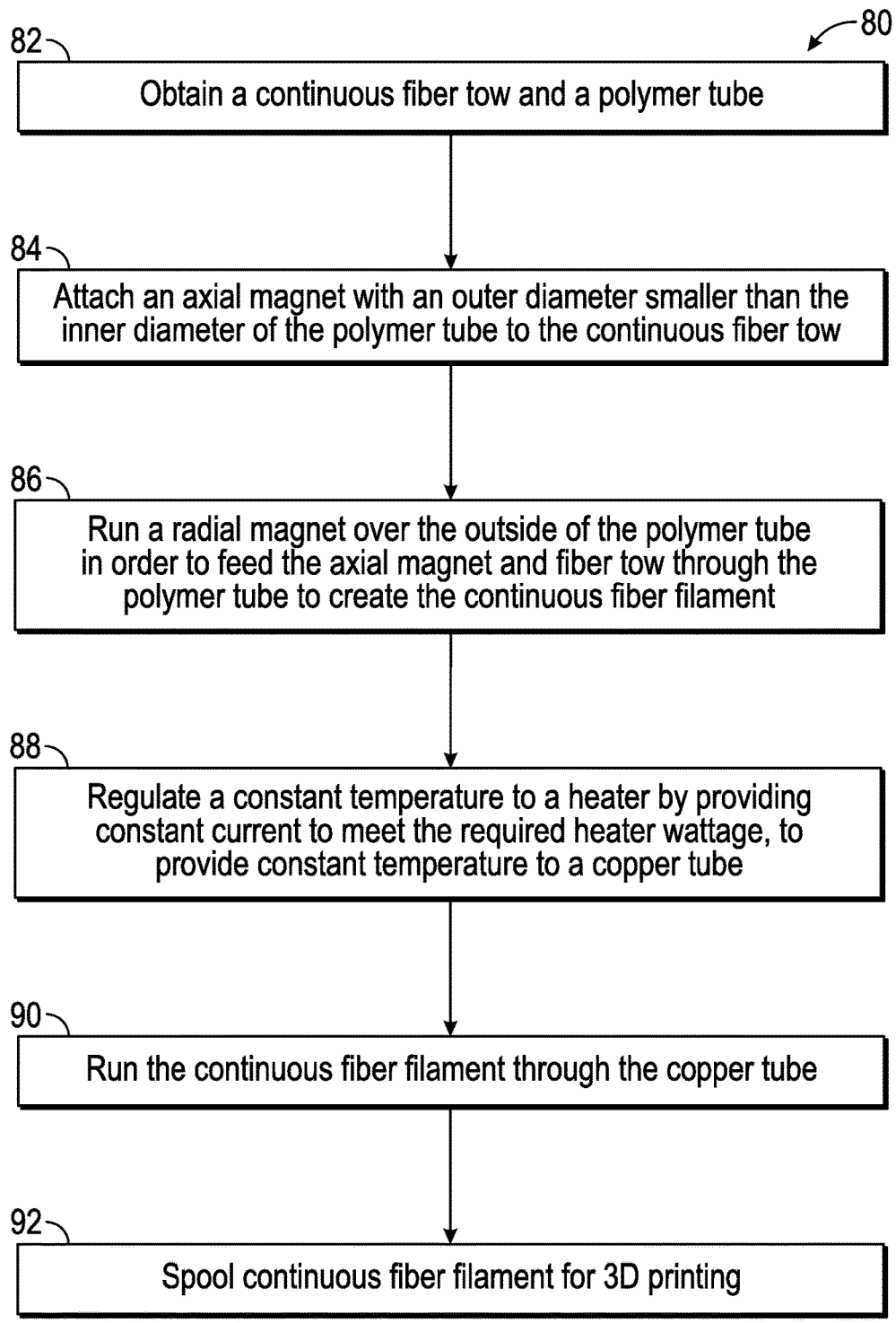
FIG. 5 is a flow chart diagram of a process for creating and wetting a continuous fiber filament.

FIG. 5 is a flow chart diagram 80 showing an exemplary process for creating the continuous fiber filament 20, where like elements are referred to using the same reference numerals discussed above. At box 82, the continuous fiber tow 12 and the polymer tube 14 are obtained. The polymer tube 14 has an inner diameter that is slightly larger than the outer diameter of the continuous fiber tow 12, as stated above. At box 84, the axial magnet 16 is attached to the continuous fiber tow 12 by, for example, using an adhesive, such as glue, rubber cement, double stick tape, etc. The axial magnet 16 has an outer diameter that is smaller than the inner diameter of the polymer tube 14 to ensure that the fiber tow 12 with the axial magnet 16 attached thereto may feed into the polymer tube 14.

Next, the radial magnet 18 is pulled along and around at least a portion of the length of the outer surface of the polymer tube 14 to feed the axial magnet 16 and the fiber tow 12 through the polymer tube 14 at box 86. As stated above, the inner diameter of the radial magnet 18 must be larger than the outer diameter of the polymer tube 14 to be pulled along and around the outer circumference of the polymer tube 14, however, the radial magnet 18 may be configured in any suitable manner and pulled along the outside of the polymer tube 14 in any manner that is suitable to pull the axial magnet 16 and the fiber tow 12 through the polymer tube 14. Thus, it may not be necessary to configure the radial magnet 18 to fit around the entire circumference of the polymer tube 14.

The temperature and current controller 36 provides the current necessary to heat the copper tube 22 of the heating sub-system 34 to a predetermined constant temperature using temperature signals from at least one of the thermocouples 38 at box 88. Once the predetermined constant temperature of the copper tube 22 is achieved at the box 88, the continuous fiber filament 20 is fed through the copper tube 22 at box 90 to melt the polymer tube 14 onto the fiber tow 12 to uniformly wet the continuous fiber filament 20. The temperature and current controller 36 adjusts the current and temperature as needed at the box 90 to maintain the melting flow temperature of the polymer tube 14 to wet the continuous fiber filament 20 uniformly with polymer from the polymer tube 14 without trapping any air. At box 92, the uniformly wetted continuous fiber filament 20 is wound onto the spool 42 using the motor 44 and the speed controller 40 as previously described. The spool 42 from the box 92 is ready for use in 3D printing applications to create a wide variety of products.

The continuous fiber filament 20 may be produced in minutes to hours using the system and process described above, and the fiber tow 12 and the polymer tube 14 combination that may be used to create the continuous fiber filament 20 may be a wide variety of combinations, meaning a broad array of 3D printable continuous fiber filaments 20 may be created using the system and process described herein.

As will be well understood by those skilled in the art, the several and various steps and processes discussed herein to describe the invention may be referring to operations performed by a computer, a processor or other electronic calculating device that manipulate and/or transform data using electrical phenomenon. Those computers and electronic devices may employ various volatile and/or nonvolatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A system for producing a uniform continuous fiber filament suitable for use in 3D printing, said system comprising:
    a fiber tow with an axial magnet attached to an end thereof;
    a polymer tube; and
    an annular radial magnet that fits around at least a portion of a circumference of the polymer tube, wherein a magnetic force between the axial magnet and the annular radial magnet feeds the fiber tow through the polymer tube by pulling the annular radial magnet along at least a portion of the circumference of the polymer tube to draw the axial magnet with the fiber tow attached thereto through the polymer tube to create the uniform continuous fiber filament.

2. The system according to claim 1 wherein the fiber tow includes one or more of E-glass, S-glass, carbon fiber, aramid fibers, or ultra high molecular weight polyethylene fibers.

3. The system according to claim 1 wherein the polymer tube is a thermoplastic.

4. The system according to claim 1 wherein an inner diameter of the polymer tube is slightly larger than an outer diameter of the fiber tow.

5. The system according to claim 1 wherein the continuous fiber filament is used to create aerospace components.

6. The system according to claim 1 wherein the continuous fiber filament is used in fused deposition modeling.

7. The system according to claim 1 further comprising a copper tube and a heater, said copper tube being heated by the heater to a predetermined temperature, wherein the continuous fiber filament is fed through the heated copper tube to heat and uniformly melt the polymer tube onto the fiber tow to uniformly wet the continuous fiber filament.

8. The system according to claim 7 further comprising a speed controller and a motor, said speed controller configured to operate the motor to pull the continuous fiber filament from a first spool through the heated copper tube and to wind the continuous fiber filament onto a second spool after the continuous fiber filament has been uniformly wetted.

9. The system according to claim 7 wherein an outer diameter of the polymer tube is smaller than an inner diameter of the copper tube, an amount dependent upon the temperature required to melt the polymer tube.

10. The system according to claim 7 further comprising a temperature controller that is configured to provide a current signal to the heater to heat the copper tube to the predetermined temperature.

11. The system according to claim 10 further comprising at least one thermocouple that provides a temperature signal from the heater to the temperature controller, said temperature controller being configured to use the temperature signal to regulate the temperature of the heater.

12. A method for producing a uniform continuous fiber filament suitable for 3D printing, said method comprising:
    attaching an axial magnet to an end of a continuous fiber tow;
    fitting a radial magnet that fits around at least a portion of an end of a polymer tube, said end being proximate to the axial magnet to create a magnetic force that pulls the axial magnet through the polymer tube when the radial magnet is pulled along the length of the polymer tube, thereby feeding the fiber tow through the polymer tube; and
    feeding the polymer tube with the fiber tow inside through a heated copper tube to uniformly melt the polymer tube to the fiber tow to create a uniform continuous fiber filament.

13. The method according to claim 12 wherein feeding the polymer tube through the heated copper tube includes heating the copper tube to a predetermined temperature using a heater.

14. The method according to claim 12 wherein the uniform continuous fiber filament is used to create aerospace components.

15. The method according to claim 12 wherein the fiber tow includes one or more of E-glass, S-glass, carbon fiber, aramid fibers, or ultra high molecular weight polyethylene fibers.

16. The method according to claim 12 wherein the polymer tube is a thermoplastic tube.

17. The method according to claim 12 further comprising providing a controller that is configured to operate a motor that is used to pull the continuous fiber filament through the copper tube and to wind the uniform continuous fiber filament on a spool.

18. The method according to claim 17 wherein the spool of the uniform continuous fiber filament is used in fused deposition modeling.

19. A method for producing a continuous fiber filament, said method comprising:
    attaching an axial magnet to an end of a continuous fiber tow;
    providing a polymer tube that includes an inner diameter that is slightly larger than an outer diameter of the continuous fiber tow;
    fitting a radial magnet around at least a portion of an end of the polymer tube, said end of the polymer tube being proximate to the axial magnet to create a magnetic force that pulls the axial magnet attached to the continuous fiber tow through the polymer tube by pulling the radial magnet along the length of the polymer tube, thereby feeding the fiber tow through the polymer tube;
    providing a heater and a temperature controller that is configured to provide a current to the heater, said heater being heated to a predetermined temperature by the temperature controller; and
    feeding the polymer tube with the fiber tow inside through the heater to uniformly melt the polymer tube onto the fiber tow to create the continuous fiber filament.

* * * * *